United States Patent
Wu (10) Patent No.: US 9,109,880 B2
(45) Date of Patent: Aug. 18, 2015

(54) SOFT COLLISION GRATING SCALE AND MEASURING METHOD THEREOF

(75) Inventor: Mengliang Wu, Dongguan (CN)

(73) Assignee: GUANGDONG RATIONAL PRECISION INSTRUMENT CO., LTD., Dongguan, Guangdong (CN)

( * ) Notice: Subject to any disclaimer, the term of this patent is extended or adjusted under 35 U.S.C. 154(b) by 44 days.

(21) Appl. No.: 13/823,899

(22) PCT Filed: Sep. 8, 2011

(86) PCT No.: PCT/CN2011/079472
§ 371 (c)(1),
(2), (4) Date: Mar. 15, 2013

(87) PCT Pub. No.: WO2013/033902
PCT Pub. Date: Mar. 14, 2013

(65) Prior Publication Data
US 2014/0173924 A1    Jun. 26, 2014

(51) Int. Cl.
*G01B 3/20* (2006.01)
*G01B 11/14* (2006.01)
*G01B 5/12* (2006.01)
*G01B 11/02* (2006.01)
*H01H 3/60* (2006.01)

(52) U.S. Cl.
CPC *G01B 11/14* (2013.01); *G01B 3/20* (2013.01); *G01B 5/12* (2013.01); *G01B 11/02* (2013.01); *H01H 3/60* (2013.01)

(58) Field of Classification Search
CPC .......... G01B 11/14; G01B 11/02; G01B 3/20; G01B 5/12; H01H 3/60
USPC ............... 33/559, 702, 706–707; 250/231.13; 356/499
See application file for complete search history.

(56) References Cited

U.S. PATENT DOCUMENTS

| | | | | |
|---|---|---|---|---|
| 5,172,485 A | * | 12/1992 | Gerhard et al. | 33/706 |
| 5,760,392 A | * | 6/1998 | Hisamoto et al. | 250/237 G |
| 5,774,219 A | * | 6/1998 | Matsuura | 356/499 |
| 6,342,697 B1 | * | 1/2002 | Nagai et al. | 250/231.13 |
| 6,578,283 B2 | * | 6/2003 | Nishi | 33/706 |

* cited by examiner

*Primary Examiner* — R. A. Smith
*Assistant Examiner* — Tania Courson (57) ABSTRACT

A soft collision grating scale and measuring method thereof comprises a fixed scale, a sliding auxiliary scale slidably disposed relative to the fixed scale, and a moving pin sliding relative to the sliding auxiliary scale. The moving pin and the sliding auxiliary scale move synchronically. A buffering mechanism is disposed on the moving pin. When the moving pin sliding relative to the sliding auxiliary scale cooperates with a buffering force of the buffering mechanism, a collision between the moving pin and stopping faces of an inspected target is automatically offset to attain a soft collision effect, which prevents the moving pin from breaking to keep an normal measurement operation and increases the precision of measurement by the fact that the sliding auxiliary scale does not rebound and an offset distance caused by reversely moving the moving pin relative to the sliding auxiliary scale can be computed.

8 Claims, 7 Drawing Sheets

SOFT COLLISION GRATING SCALE AND MEASURING METHOD THEREOF

FIELD OF THE INVENTION

The present invention relates to measuring, especially to a soft collision grating scale and measuring method thereof.

DESCRIPTION OF THE RELATED ART

A displacement measurement of grating scale (or a grating scale for short) is a measuring and feedback device that adopts optical principles of raster. The grating scale is usually applied to lathes, processing centers, and measuring devices for conducting inspections of linear displacement or angular displacement. Signals measured and output by the grating scale are directed to the digital pulse that features in comprehensive inspection, precise examination, and prompt response. For example, the grating scale can be applied to a numerically controlled lathe for conducting inspections of the cutting tools and the workpieces. Wherein, the grating scale is utilized to observe and trace the milling error so as to offset the motion error of the cutting tools.

Figure 1:
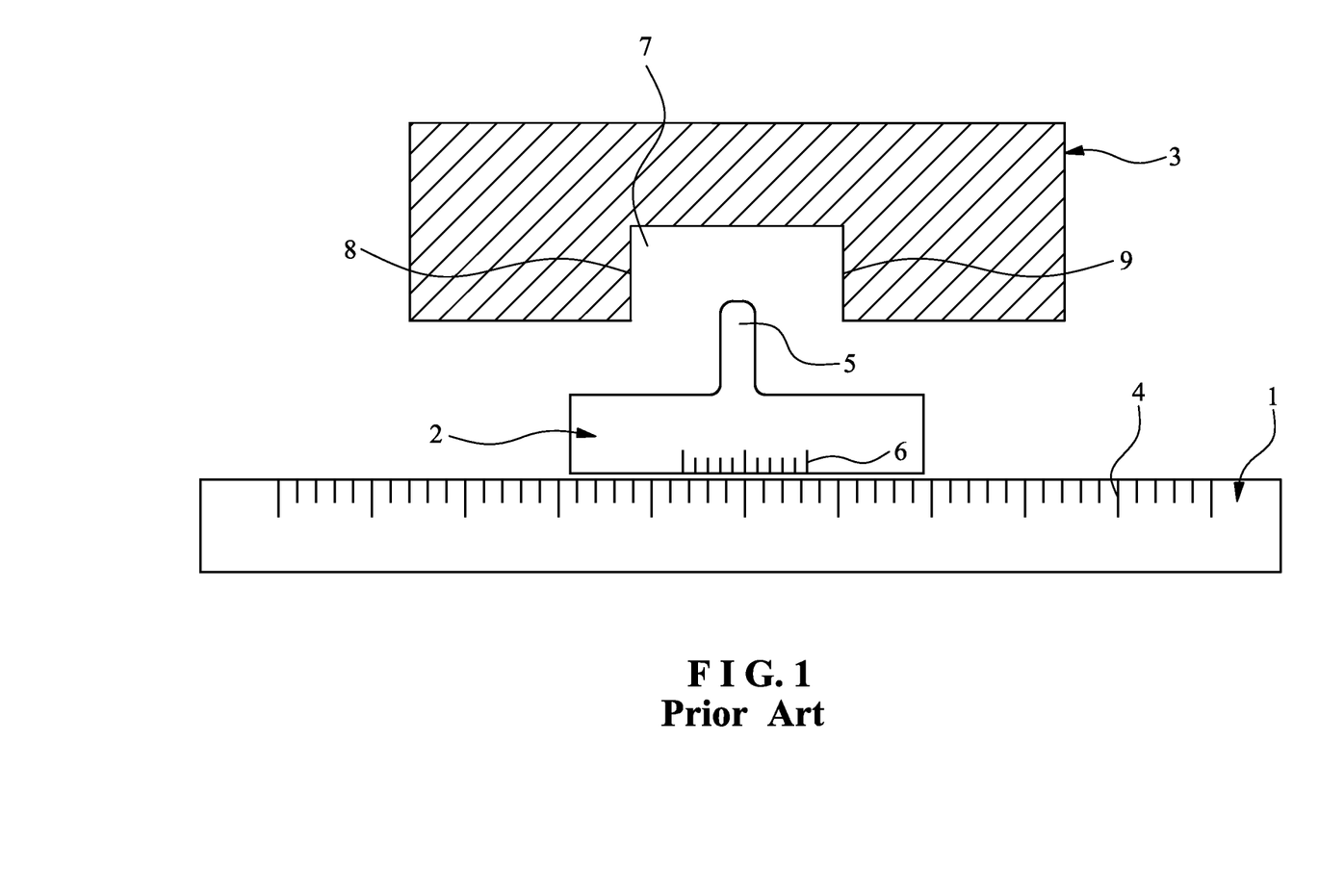
FIG. 1 is a schematic view showing a conventional grating scale.

Referring to FIG. 1, a common grating scale comprises a fixed scale 1 and a sliding auxiliary scale 2. The fixed scale 1 is arranged fixedly to an inspected target 3. Equidistant marks 4 are defined on the fixed scale 1. The sliding auxiliary scale 2 is slidably disposed relative to the fixed scale 1. A pin 5 is fixed to the sliding auxiliary scale 2, and reference marks 6 are arranged on the sliding auxiliary scale 2. The reference marks 6 and the equidistant marks 4 are set in accordance with each other. In measuring, the fixed scale 1 is fixed out of the inspected target 3, and the pin 5 is arranged into an indentation 7 of the inspected target 3. Moving the sliding auxiliary scale 2 concurrently motivates the pin 5, so that the pin 5 sequentially collides with a first stopping face 8 and a second stopping face 9 of the indentation 7. Thereby, when the sliding auxiliary scale 2 is moved leftward on the fixed scale 1, a first distance is acquired, and when the sliding auxiliary scale is moved rightward on the fixed scale 1, a second distance is acquired. Accordingly, the first distance and the second distance is summed and the summed result plus the diameter or width of the pin is recorded as the distance between the first stopping face 8 and the second stopping face 9.

Afore grating scale is able to measure the linear distance between two points. However, the measurement is yet insufficient and inefficient since it lacks a comprehensive application. Disadvantages of the conventional grating scale are as follows: First of all, the pin fixed and the sliding auxiliary scale move synchronically. During the measuring, the pin usually collides with the first stopping face or the second stopping face forcedly, which easily breaks the structure of the pin and influences the measurement operation. Secondly, when the pin collides with the first stopping face or the second stopping face, the sliding auxiliary scale inertially moves backward, and it causes imprecise measurement. Accordingly, it is difficult to promptly and precisely measure the inspected target.

SUMMARY OF THE INVENTION

The object of the present invention is to provide a grating scale with soft collision and a measuring method thereof for avoiding breaking the grating scale and influencing the measurement operation.

The other object of the present invention is to provide a soft collision grating scale and measuring method thereof for enhancing the measuring precision of the grating scale.

The present invention is achieved as follows:

A soft collision grating scale comprises a fixed scale, a sliding auxiliary scale, and a moving pin. The sliding auxiliary scale is slidably disposed relative to the fixed scale. The sliding auxiliary scale and the fixed scale have respective raster scales disposed corresponding to each other. The moving pin and the sliding auxiliary scale move synchronically. The moving pin is slidably disposed relative to the sliding auxiliary scale. The moving pin and the sliding auxiliary scale have respective reference scales disposed corresponding to each other. A buffering mechanism is provided to cooperate with the moving pin.

A measuring method of a soft collision grating scale as claimed in claim 1 comprises steps of:

(1) place a protruding head of the moving pin between a first stopping face and a second stopping face of an inspected target; wherein, the protruding head of the moving pin has a width L; fix the fixed scale and record an original position of the sliding auxiliary scale corresponding to the fixed scale and an original position of the moving pin corresponding to the sliding auxiliary scale;

(2) slide the sliding auxiliary scale toward the first stopping face for the moving pin to be propped against the first stopping face; measure a first distance S1 created by displacing the moving pin relative to the sliding auxiliary scale, and measure a second distance S2 by displacing the sliding auxiliary scale relative to the fixed scale;

(3) place the sliding auxiliary scale and the moving pin to the original position; slide the sliding auxiliary scale toward the second stopping face for the moving pin to be propped against the second stopping face; measure a third distance S3 by displacing the moving pin relative to the sliding auxiliary scale, and measure a fourth distance S4 by displacing the sliding auxiliary scale relative to the fixed scale; and (4) compute a distance between the first stopping face and a second stopping face of the inspected target via a formula (S2−S1)+(S4−S3)+L.

Accordingly, the present invention has advantages as follows:

1. When the moving pin is slidably disposed relative to the sliding auxiliary scale and the buffering mechanism provides a buffering effect for the moving pin, an opposite off set is automatically caused in time of the collision between the moving pin and the first stopping face of the inspected target or between the moving pin and the second stopping face. Namely, the soft collision of the present invention substitutes for the conventional forced collision, which prevents the moving pin from breaking and extends the using life thereof. Preferably, the measurement operation can be conducted smoothly.

2. The moving pin is slidably disposed relative to the sliding auxiliary scale, and the buffering mechanism provides the buffering effect for the moving pin. Moreover, the cooperation of the raster scales and the reference scales prevents the sliding auxiliary scale from bounce after the moving pin collides with the first stopping face or the second stopping face. Specially, an offset distance is achieved by the moving pin moving backward on the sliding auxiliary scale, so that the offset distance can be measured for acquiring a more precise result so as to promote a prompt and accurate measurement.

3. The buffering mechanism includes two buffering members for the moving pin; one ends of the two buffering members are connected to the sliding auxiliary scale, and the other ends of the two buffering members are connected to two ends of the moving pin. Herein, afore structure is simple and the operation thereof is convenient. Preferably, the moving pin goes back to the original position automatically.

4. A first photoelectric member, a second photoelectric member, a counter, a storing member, and a calculator of a reading system are further provided for collecting data and processing the data so as to get a final precise measuring result. Preferably, the present invention enhances the automation, which promotes the measuring convenience.

DETAILED DESCRIPTION OF THE PREFERRED EMBODIMENTS

Referring to FIGS. 2 to 7, the substantial structure of the present invention is shown. A soft collision grating scale of the present invention comprises a fixed scale 10, a sliding auxiliary scale 20, and a moving pin 30.

Figure 2:
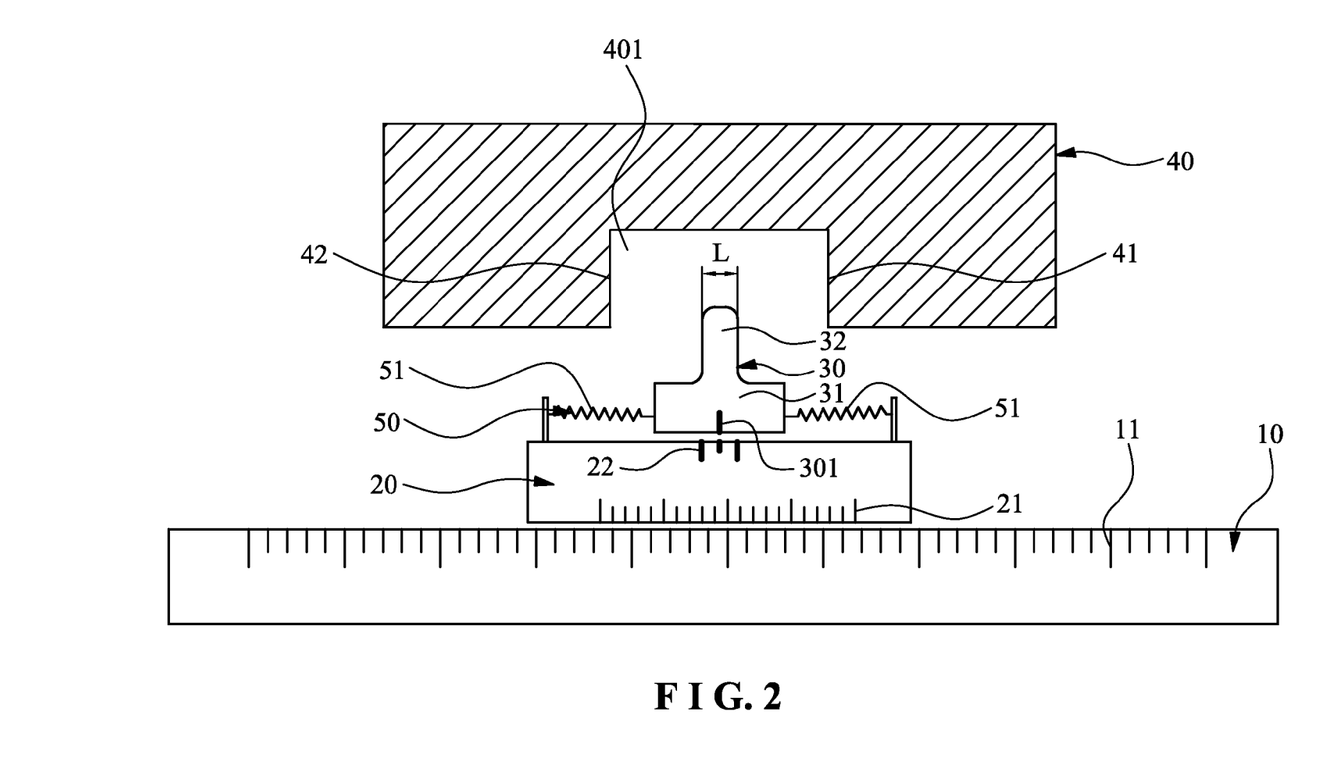
FIG. 2 is a schematic view showing the present invention in measuring.

Wherein, the fixed scale 10 is fixed correspondingly to an inspected target 40. A first raster scale 11 is arranged on the fixed scale 10.

The sliding auxiliary scale 20 is slidably disposed relative to the fixed scale 10. One side of the sliding auxiliary scale 20 near the fixed scale 10 includes a second raster scale 21, and the other side of the sliding auxiliary scale 20 includes two first reference scales 22. The second raster scale 21 and the first raster scale 11 are disposed correspondingly to each other. The sliding auxiliary scale 20 collects images of the first raster scale 11 of the fixed scale 10 and combines the position of the second raster scale 21 for acquiring a result of measured position.

The moving pin 30 and the sliding auxiliary scale 20 move synchronically. The moving pin 30 is slidably disposed relative to the sliding auxiliary scale 20. The moving pin 30 is formed in to a T-shape and includes a base 31 and a head 32 extended outward from the base 31. A second reference scale 301 is disposed on the base 31 of the moving pin 30. The second reference scale 301 is disposed correspondingly to the first reference scales 22. The second reference scale 301 is located between two first reference scales 22. The second reference scale 301 is disposed in the middle of the two first reference scales 22 under an original position. The head 32 protrudes into an indentation 401 of the inspected target 40, between a first stopping face 41 and a second stopping face 42 of the indentation 401. The moving pin 30 collects images of the first reference scales 22 on the sliding auxiliary scale and combines the position of the second reference scale 301 for acquiring a result of measured position.

A buffering mechanism 50 is arranged for the moving pin 30. The buffering mechanism 50 allows a soft collision to be achieved between the moving pin 30 and the first stopping face 41 or the second stopping face 42, so that the moving pin 30 avoids breaking. The buffering mechanism 50 is disposed between the moving pin 30 and the sliding auxiliary scale 20. The buffering mechanism 50 includes two buffering members 51. The two buffering members 51 are respectively arranged out of two ends of the moving pin 30. One ends of the buffering members 51 are connected to the sliding auxiliary scale 20, and the other ends of the buffering members 51 are connected to two ends of the moving pin 30, respectively. In this embodiment, the buffering members 51 are directed to springs.

Figure 7:
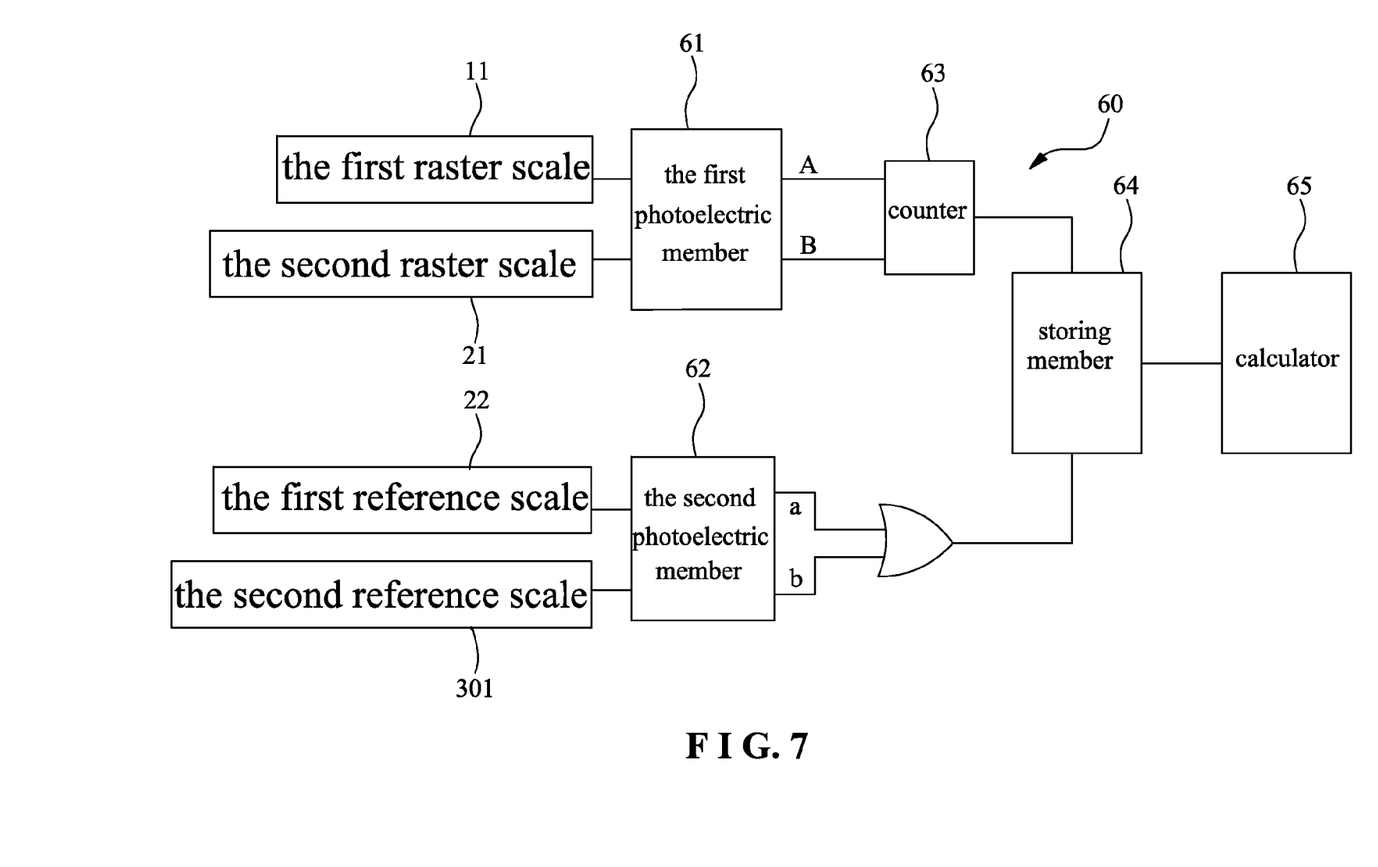
FIG. 7 is a schematic view showing a circuit structure in a reading system of the present invention.

The soft collision grating scale further comprises a reading system 60, and the reading system 60 has a first photoelectric member 61, a second photoelectric member 62, a counter 63, a storing member 64, and a calculator 65. The first raster scale 11 and the second raster scale 21 are connected to the first photoelectric member 61, and the first photoelectric member 61 is connected to the counter 63. The first reference scales 22 and the second reference scale 301 are connected to the second photoelectric member 62, and the second photoelectric member 62 and the counter 63 are connected to the storing member 64. The storing member 64 temporarily stores data, and the storing member 64 is connected to the calculator 65. Accordingly, the calculator 65 processes the data in the storing member 64 so as to achieve a final measured result.

The measuring method of the present invention is as follows:

First of all, referring to FIG. 2, a protruding head or the head 32 of the moving pin is arranged between the first stopping face 41 and the second stopping face 42 of the inspected target 40. Wherein, the head 32 of the moving pin 30 has a width L. Store the width data L in the storing member 64 and then fix the fixed scale 10 toward the inspected target 40. Thence, record an original position of the sliding auxiliary scale 20 corresponding to the fixed scale 20 and an original position of the moving pin 30 corresponding to the sliding auxiliary scale 20.

Figure 3:
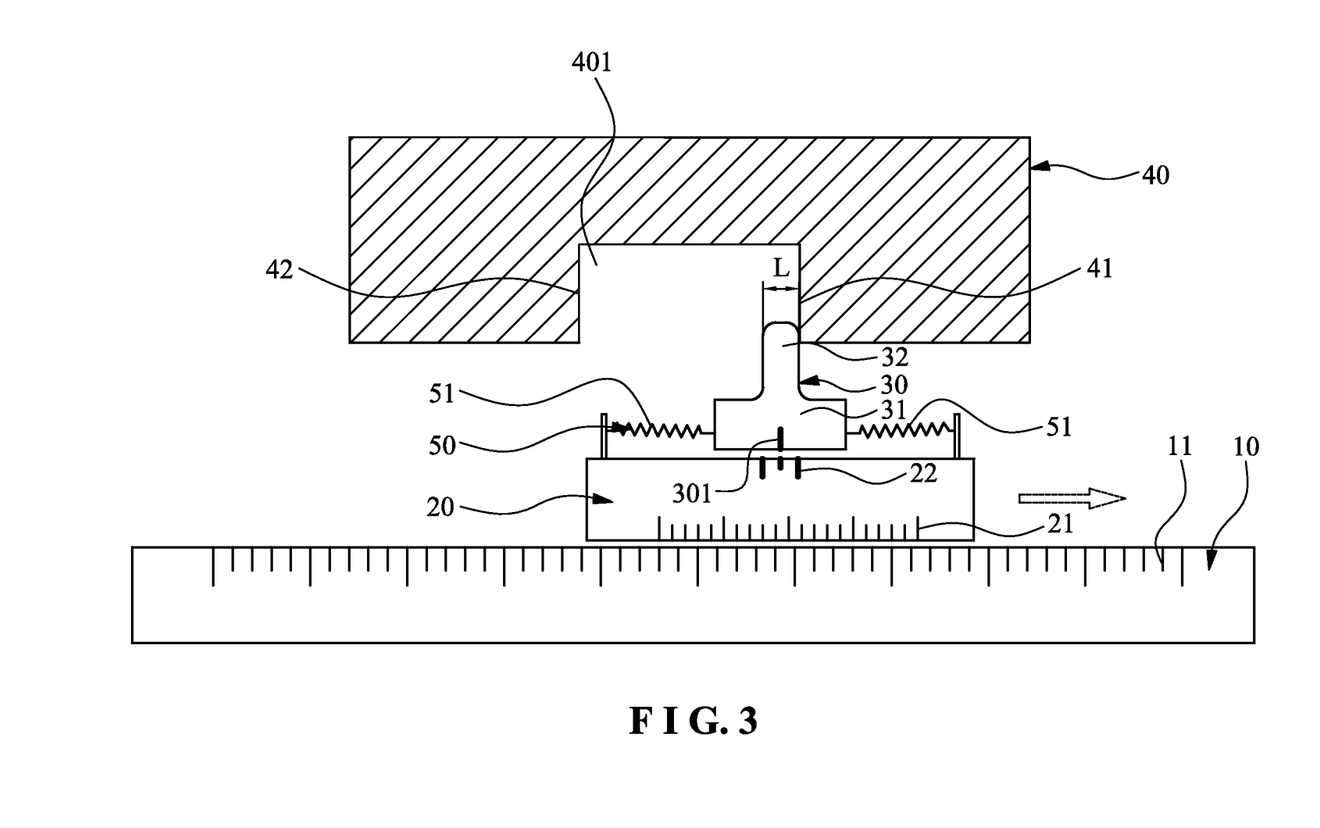
FIG. 3 is a schematic view showing a first preferred embodiment of the present invention in measuring.

Referring to FIG. 3, the sliding auxiliary scale 20 slides toward the first stopping face 41, and the moving pin 30 is synchronically motivated by the sliding auxiliary scale 20, so that the head 32 of the moving pin 30 is able to collide with the first stopping face 41.

Figure 4:
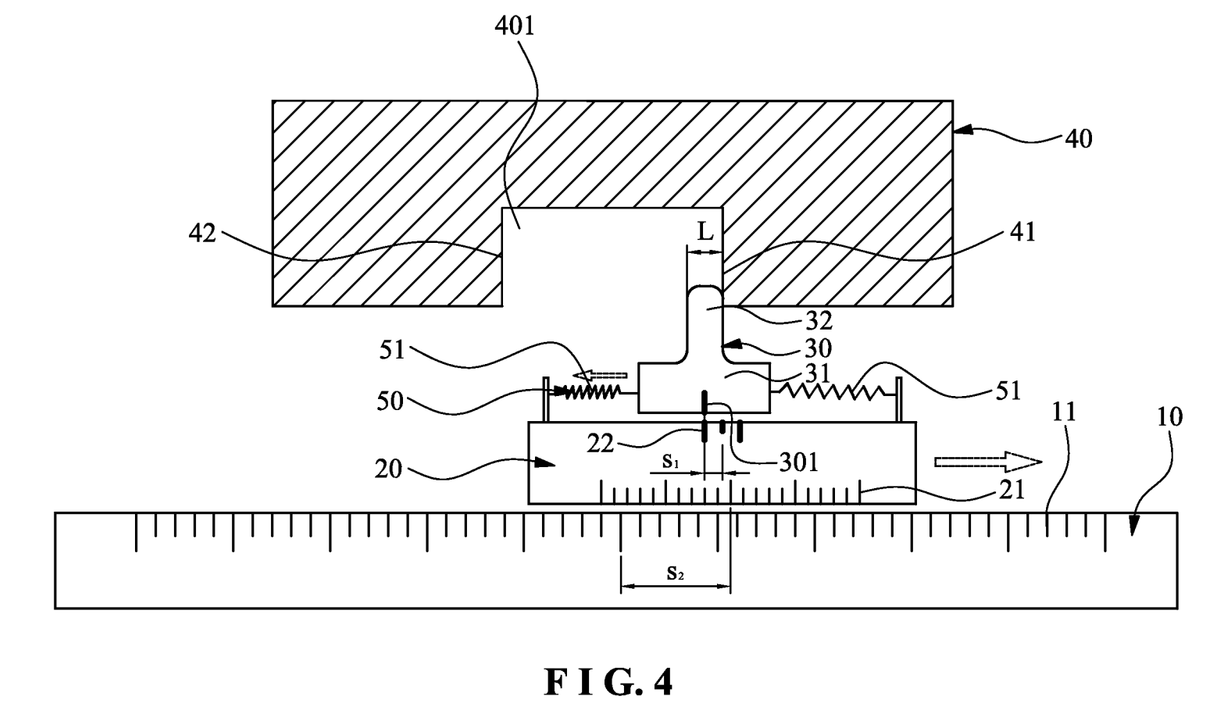
FIG. 4 is a schematic view showing a second preferred embodiment of the present invention in measuring.

Referring to FIG. 4, when the sliding auxiliary scale 20 decelerates and stops, the moving pin 30 slides leftward on the sliding auxiliary scale 20 so as to compress the left buffering member 51 but stretch the right buffering member 51. Accordingly, when the sliding auxiliary scale 20 is moved until the left first reference scale 22 confronts the second reference scale 301 on the moving pin 30, the second photoelectric member 62 is triggered to generate a/b phase signals. Wherein, one of the two phase signals is selected, and a first distance S1 that the moving pin 30 is displaced on the sliding auxiliary scale 20 is read out. The read data are stored in the storing member 64. In the meantime, the first photoelectric member 61 is also triggered to generate the a/b phase signals, and the two phase signals are concurrently input to the counter 63. Moreover, a second distance S2 that the sliding auxiliary scale 20 is displaced on the fixed scale 10 is further read out by the counter 63. The read data are stored in the storing member 64.

Figure 5:
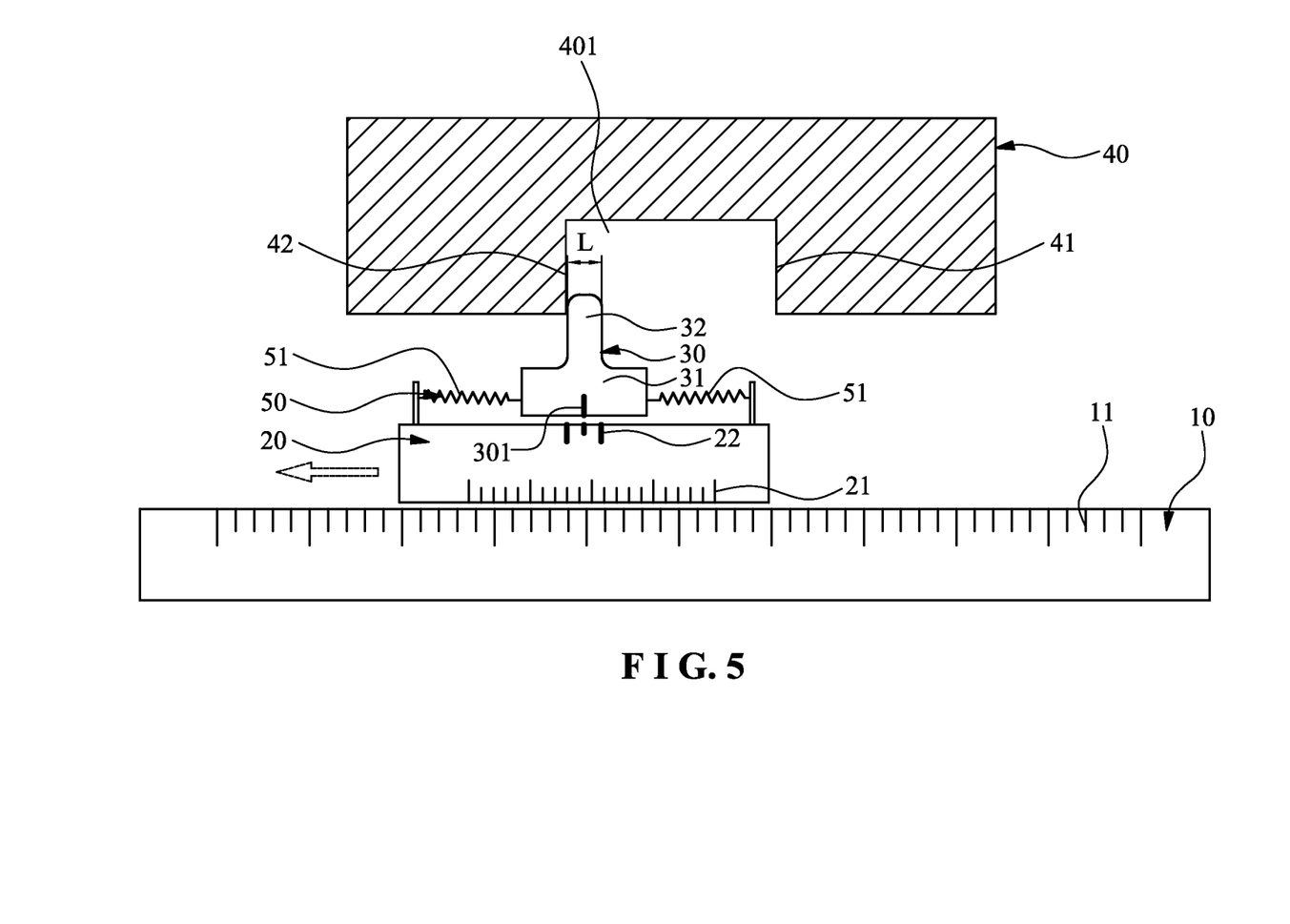
FIG. 5 is a schematic view showing a third preferred embodiment of the present invention in measuring.

Thence, the sliding auxiliary scale 20 and the moving pin 30 are moved back to the original position, and the sliding auxiliary scale 20 is slid toward the second stopping face 42. As shown in FIG. 5, the moving pin 30 is synchronically motivated by the sliding auxiliary scale 20, so that the head 32 of the moving pin 30 is able to collide with the second stopping face 42.

Figure 6:
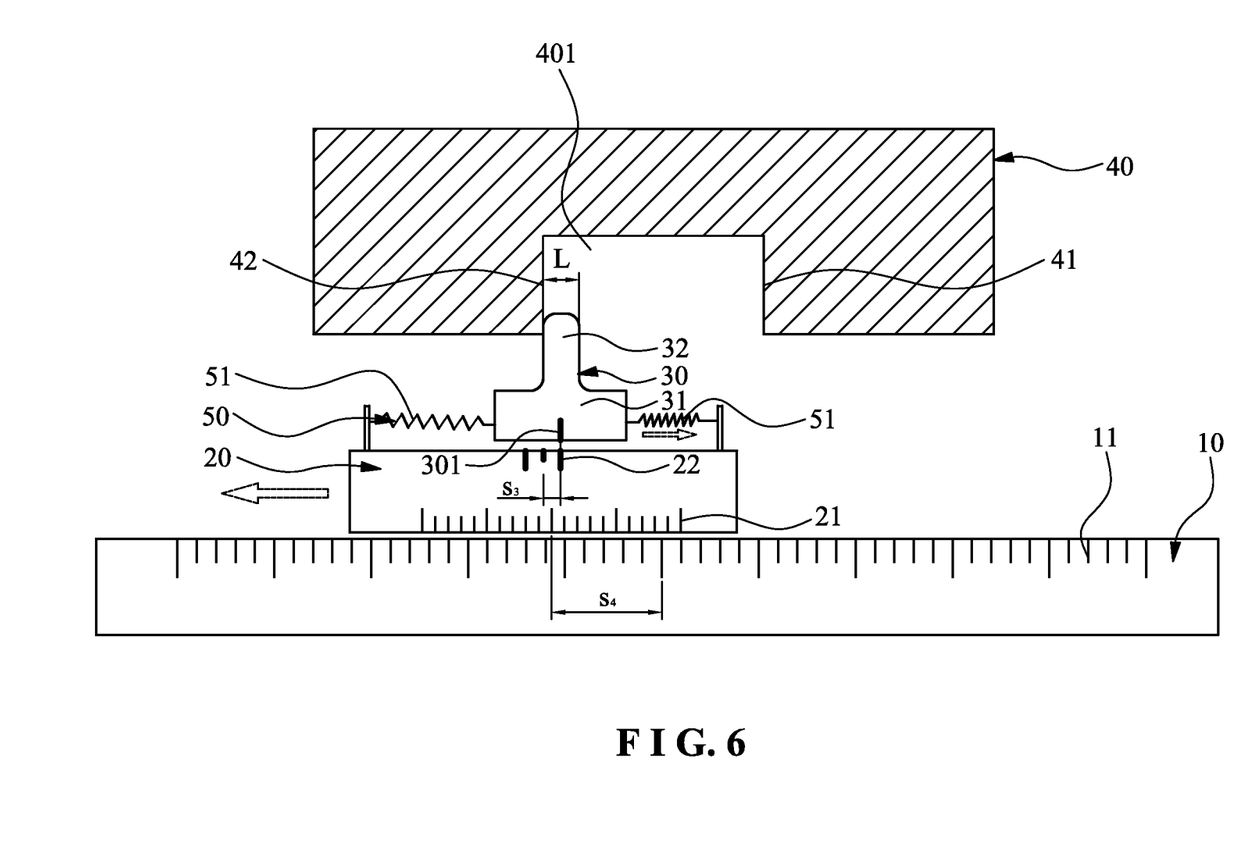
FIG. 6 is a schematic view showing a fourth preferred embodiment of the present invention in measuring.

Continuingly, as shown in FIG. 6, the sliding auxiliary scale 20 decelerates and stops, and the moving pin 30 moves rightward on the sliding auxiliary scale 20. Whereby, the right buffering member 51 compresses, but the left buffering member 51 stretches. When the sliding auxiliary scale 20 moves until the right first reference scale 22 confronts the second reference scale 301 on the moving pin 30, the second photoelectric member 62 is triggered to generate the a/b phase signals. One of the phase signals is selected, and a third distance S3 that the moving pin 30 is displaced on the sliding auxiliary scale 20 is read out. The read data are stored in the storing member 64. In the meantime, the first photoelectric member 61 is also triggered to generate the a/b phase signals, and the two phase signals are concurrently input to the counter 63. Moreover, a fourth distance S4 that the sliding auxiliary scale 20 is displaced on the fixed scale 10 is further read out by the counter 63. The read data are stored in the storing member 64.

Subsequently, the calculator 65 processes the data in the storing member 64 and acquires the distance between the first stopping face 41 and the second stopping face 42 via a formula (S2−S1)+(S4−S3)+L.

Especially, the present invention is able to measure the linear distance between any two points but is not limited to measure the distance between two stopping faces of an indentation.

I claim:

1. A soft collision grating scale comprising a fixed scale, a sliding auxiliary scale, and a moving pin; said sliding auxiliary scale being slidably disposed relative to said fixed scale; said sliding auxiliary scale and said fixed scale having respective raster scales disposed corresponding to each other; said moving pin and said sliding auxiliary scale moving synchronically; said moving pin being slidably disposed relative to said sliding auxiliary scale; said moving pin and said sliding auxiliary scale having respective reference scales disposed corresponding to each other; a buffering mechanism being provided to cooperate with said moving pin.

2. The soft collision grating scale as claimed in claim 1, wherein said buffering mechanism is disposed between said moving pin and said sliding auxiliary scale; said buffering mechanism includes two buffering members; one ends of said buffering members are connected to said sliding auxiliary scale, and the other ends of said buffering members are connected to two ends of said moving pin, respectively.

3. The soft collision grating scale as claimed in claim 2, wherein buffering member is directed to a spring.

4. The soft collision grating scale as claimed in claim 1, wherein said moving pin includes a base and a head extended outward from said base.

5. The soft collision grating scale as claimed in claim 1, wherein said raster scale includes a first raster scale disposed on said fixed scale and a second raster scale disposed on said sliding auxiliary scale; said reference scale includes two first reference scales disposed on said sliding auxiliary scale and a second reference scale disposed on said moving pin; said second reference scale is located between said two first reference scales; said second reference scale is disposed in the middle of said two first reference scales under an original position.

6. The soft collision grating scale as claimed in claim 5 further comprises a reading system, and said reading system has a first photoelectric member, a second photoelectric member, a counter, a storing member, and a calculator; said first raster scale and said second raster scale are connected to said first photoelectric member, and said first photoelectric member is connected to said counter; said first reference scales and said second reference scale are connected to said second photoelectric member, and said second photoelectric member and said counter are connected to said storing member; said storing member is connected to said calculator.

7. A measuring method of a soft collision grating scale as claimed in claim 1 comprising steps of:
(1) placing a protruding head of a moving pin between a first stopping face and a second stopping face of an inspected target; wherein said protruding head of said moving pin has a width L; fixing a fixed scale and recording an original position of a sliding auxiliary scale corresponding to said fixed scale and an original position of said moving pin corresponding to said sliding auxiliary scale;
(2) sliding said sliding auxiliary scale toward said first stopping face for said moving pin to be propped against said first stopping face; measuring a first distance S1 created by displacing said moving pin relative to said sliding auxiliary scale, and measuring a second distance S2 by displacing said sliding auxiliary scale relative to said fixed scale;
(3) placing said sliding auxiliary scale and said moving pin to an original position; sliding said sliding auxiliary scale toward said second stopping face for said moving pin to be propped against said second stopping face; measuring a third distance S3 by displacing said moving pin relative to said sliding auxiliary scale, and measuring a fourth distance S4 by displacing said sliding auxiliary scale relative to said fixed scale; and
(4) computing a distance between said first stopping face and a second stopping face of said inspected target via a formula (S2−S1)+(S4−S3)+L.

8. The measuring method as claimed in claim 7, wherein, in step (2) and step (3), a second photoelectric member reads said first distance S1 and said third distance S3 measured by displacing said moving pin relative to said sliding auxiliary scale as a first read data for storing said first read data in a storing member; use a first photoelectric member and a counter to read said second distance S2 and said fourth distance S4 measured by displacing said sliding auxiliary scale relative to said fixed scale as a second read data for storing said second read data in said storing member; and apply a calculator to compute said first read data and said second read data stored in said storing member via a formula (S2−S1)+(S4−S3)+L so as to acquire a distance between said first stopping face and said second stopping face.

* * * * *